UNITED STATES PATENT OFFICE.

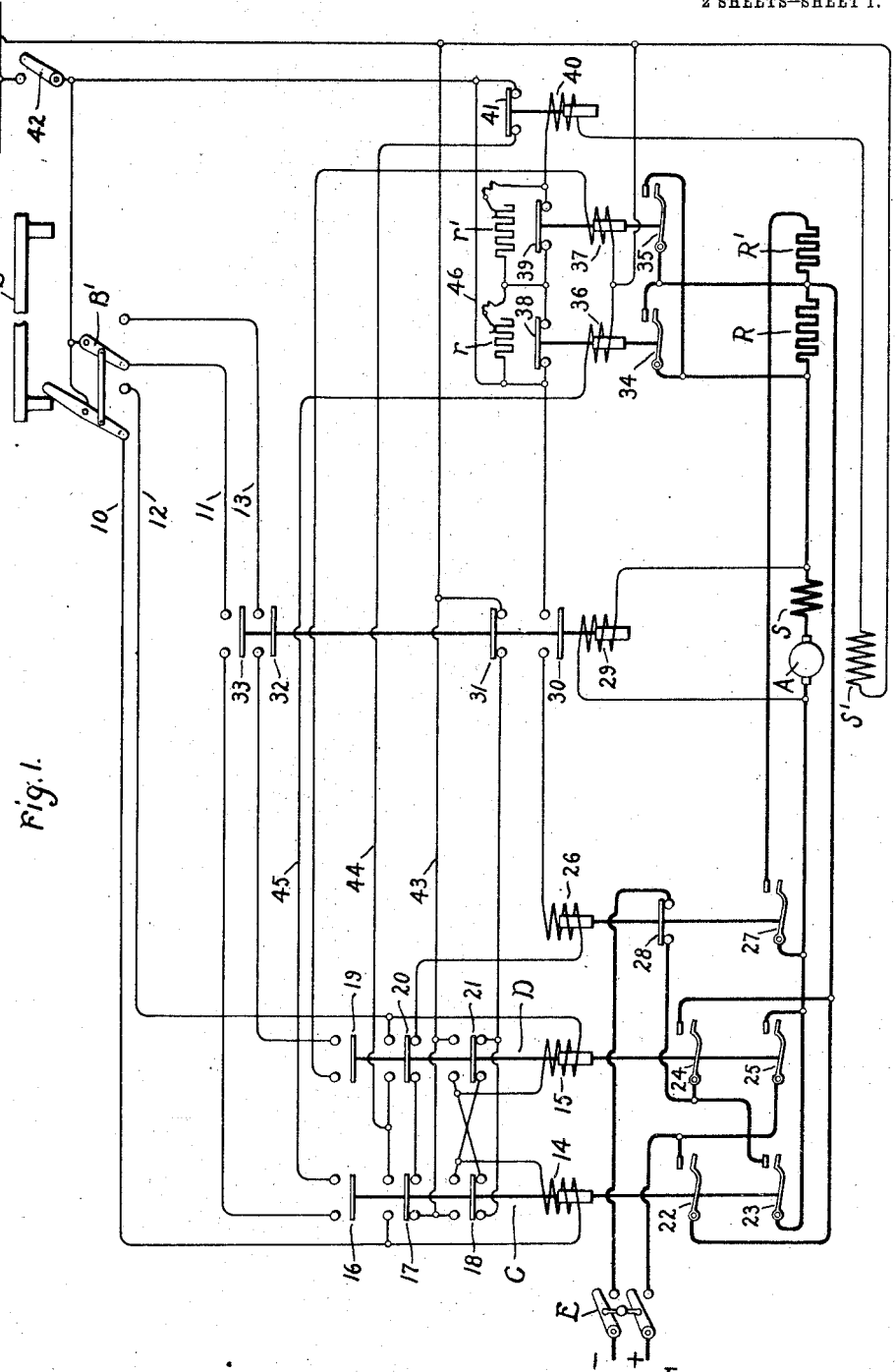

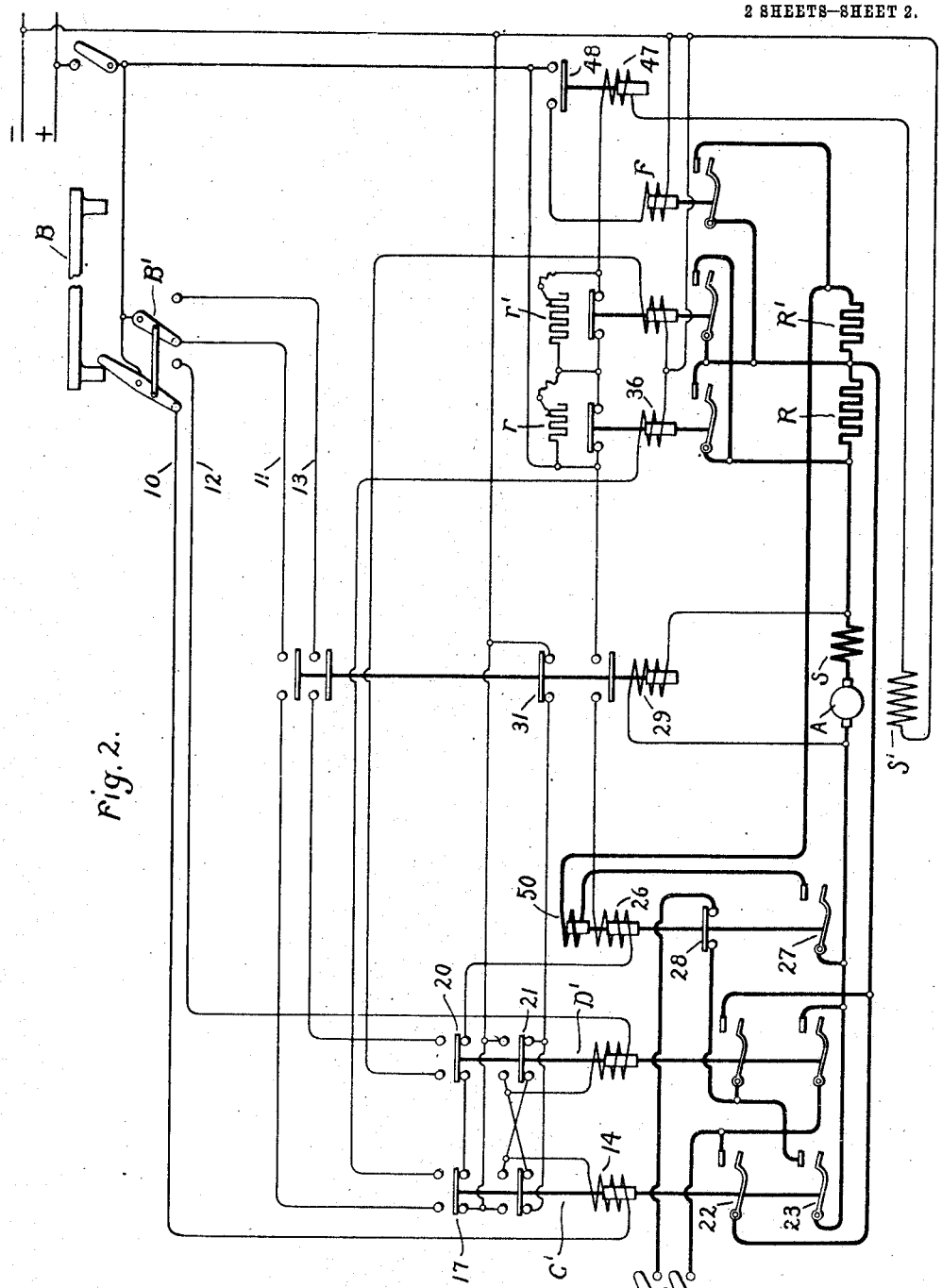

JOHN E. BROBST, OF SCHENECTADY, NEW YORK, ASSIGNOR TO GENERAL ELECTRIC COMPANY, A CORPORATION OF NEW YORK.

MOTOR-CONTROL SYSTEM.

1,043,799.  Specification of Letters Patent.  Patented Nov. 12, 1912.

Application filed April 24, 1912. Serial No. 692,957.

*To all whom it may concern:*

Be it known that I, JOHN E. BROBST, a citizen of the United States, residing at Schenectady, county of Schenectady, State of New York, have invented certain new and useful Improvements in Motor-Control Systems, of which the following is a specification.

My invention relates to the control of electric motors and has for its object the provision of means whereby an electric motor may be started, stopped and generally controlled in a reliable, simple an defficient manner.

The invention relates more specifically to the control of reversible electric motors, one of the objects of my invention being to provide means whereby an electric motor may be quickly stopped and its direction of rotation reversed.

While my invention may be of general application, I have found that it is particularly useful in connection with such mechanisms as planers, printing presses and the like, in which the direction of movement of a heavy mass must be reversed periodically. It is essential that this class of machines be brought to rest quickly and with certainty and then started in an opposite direction with a minimum strain upon the apparatus. To this end I connect the electric motor directly and positively to the machine to be driven and provide means whereby the motor is periodically stopped and reversed. In the use of these machines, as, for instance, in the case of a planer, the operation is controlled by a master switch which is operated at or near the limit of movement in each direction. This switch changes the connections so that the motor will be reversed but of course this reversal cannot take place immediately since the motor armature and the bed of the planer which have considerable inertia must first be stopped. It has been found that the motor which moves the bed of a planer or similar machine may be effectively stopped by dynamic braking of the motor, that is, by causing the motor to act as a generator and deliver current.

One of the objects of my invention is to provide improved means for dynamically braking the motor so as to bring it to rest quickly and without injury either to the motor, as for instance by sparking on the commutator, or to any other parts of the apparatus.

In the operation of planers and the like it is customary to have the bed of the machine run faster on its return stroke when no work is being done than on the forward stroke when the cut is being taken. It is also customary to provide means for adjusting the speed to the character of the material worked upon and the depth of cut. Where the planer is driven by an electric motor this variation in speed is best accomplished by varying the field strength of the motor, so that normally the motor will be running upon a weakened field. When, however, the motor is to be stopped by dynamic braking the field should be as strong as possible, since the stronger the field the greater the dynamic braking effect that can be obtained. If, however, the motor is operating with a weakened field when it drives the load it is impossible to have the field at maximum strength the moment the master switch is operated to cause the dynamic braking circuit to be closed because the field will not immediately come to full strength when the field resistance is cut out of circuit. Instead it will build up gradually due to the inductive effect of the field circuit. If, therefore, the dynamic braking circuit is so adjusted that the armature current will be the maximum that the motor is able to handle without sparking at the moment when the dynamic braking begins, the current will be considerably smaller than the armature is able to handle when the field has built up to its maximum strength. In accordance with my invention, therefore, I control the armature current in accordance with the field strength so as to avoid sparking at the brushes when the dynamic braking circuit is closed, and at the same time obtain a maximum braking effect by increasing the armature current when the field builds up to its full strength. In this way I am enabled to bring the motor and the load which it drives to rest in the shortest practicable time after the dog on the planer bed is operated to reverse the switch.

In one embodiment of my invention the initial dynamic braking current is produced by returning energy to the line, that is, instead of actually cutting off the line and generating current through a short circuit around the armature, the motor is left connected to the line and the strengthening of the field upon the throwing of the reversing switch causes the motor to act as a generator and by generating an electromotive force higher than the impressed electromotive force returns energy to the line, thereby gradually slowing down the motor armature due to the braking effect. The arrangement is such that during this cycle the braking current will be kept relatively low in some manner as for instance by including a resistance in the braking circuit. This braking effect is being produced while the field is building up. When the field has reached a predetermined strength I provide means whereby the braking current is automatically increased. This increase in current I produce in one embodiment of my invention by causing the motor to be disconnected from the line and short circuiting it upon itself through a resistance. This change of braking conditions is caused to take place automatically by a relay connected in the field circuit which upon the field obtaining a predetermined strength will operate to automatically effect the desired connections. In another embodiment of my invention the initial braking current is produced by cutting off the line and generating current through a short circuit around the armature which includes a brake resistance. When the field reaches a predetermined strength a section of the resistance is short circuited so as to increase the braking current.

Other objects and purposes of my invention will appear in the course of the following specification in which I have shown my invention embodied in concrete form for purposes of illustration.

In the accompanying drawing in which I have illustrated my invention diagrammatically, Figure 1 shows one embodiment and Fig. 2 shows a modification thereof.

Referring first to Fig. 1, A represents the armature, S the series commutating pole winding, and S' the shunt field winding of an electric motor of standard form. In the present instance I have shown this motor equipped for driving a machine such as a planer or the like, the moving element of which, B, operates the reversing switch B' in the ordinary manner. This switch is of the double pole type and in one position connects the positive side of the line with wires 10 and 11 and in the other position connects the positive side of the line with wires 12 and 13. This switch B controls two electromagnetic reversing switches C and D having actuating windings 14 and 15, respectively. The switch C is provided with interlocks 16, 17 and 18, and the switch D is provided with similar interlocks 19, 20 and 21. These interlocks are for the purpose of insuring that switches C and D will not both be closed at the same time and for bringing about certain other operations hereinafter described. The switch C has two switch members 22 and 23 for connecting the motor to the line for one direction of rotation, while the switch D has similar switch members 24 and 25 for connecting the motor to the line for the opposite direction of rotation. For short circuiting the motor on itself, I provide an electromagnetic switch or brake contactor consisting of the winding 26 and the switch member 27. This brake contactor is also provided with a switch 28 for opening the line independently of the switches 22 and 25. The winding 26 of the brake contactor can only be energized when the switches C and D are both in their open position, since it is energized through the interlocks 17 and 20. A starting resistance R is controlled by the counter electromotive force relay 29 provided with four interlocks 30, 31, 32 and 33. When the relay 29 operates, due to the speeding up of the motor, either one or the other of switches 34 and 35 will be closed by its respective winding 36 or 37. With the switch B' in the position shown in the drawing the winding 36 will be energized through wire 11, interlock 33, and interlock 16 on the switch C. If the switch B' is moved to the opposite position, the winding 37 of the switch 35 will be energized through wire 13, interlock 32, on the counter electromotive force relay and interlock 19 on the reversing switch D.

Assuming that the motor is at rest and that the switch 42 is closed, it will be noted that the shunt field winding S' is connected in circuit with the mains through switches 38 and 39 and the winding of relay 40, the function of which will be hereinafter described. If now, switch B' is thrown in the position shown in the drawing, a circuit will be closed from the positive side of the line through the conductor 10, the energizing winding of the switch C, the interlocking contacts 21 on the switch D and the interlocking contacts 31 on the counter electromotive force relay to the other side of the line. The switch C will, therefore, be operated to close the switch members 22 and 23 and this will connect the armature circuit with the motor to the line as follows: Starting from the positive side of the line, the switch E being closed the circuit leads through switch member 22, resistance R, commutating pole winding S, armature A, switch members 23, and thence through switch 28 to the negative side of the line. The motor will, therefore, start and as soon as it has reached a predetermined speed the counter electromotive force relay 29 wil operate to open the interlock 31 and close interlocks 30, 32 and 33. The opening of interlock 31 does not deënergize the winding 14 of the switch C because this switch in operating closes a maintaining circuit through the upper contacts of the interlock 18 directly to the negative side of the line. The closing of the interlock 33 completes a circuit from the positive side of the line through conductor 11, interlock 16 on the switch C to the winding 36 of the switch 34, and thence to the negative side of the line. This causes the switch 34 to be closed, cutting out the resistance R in the armature circuit. At the same time the switch 38 is opened and a resistance $r$ is included in the circuit of the field winding S' of the motor. This causes the motor to accelerate to a speed which is determined by the position of the contact member on the resistance $r$, this contact member being adjustable for the purpose of regulating the speed at which the motor drives the bed of the planer forward.

The winding of the relay 40 will be constantly energized while the motor is in operation since it is included in the field circuit of the motor, and the field of this relay is so adjusted that when the field is at full strength, that is, when the full current which the motor field is designed to carry, is flowing, the relay will be operated to open the switch 41, but when the field is weakened by the introduction of the field resistance in the field circuit, this relay will drop and close the switch 41. When the motor is started in either one direction or the other, the field will always be at full strength, as hereinafter pointed out, and the switch 41 of the relay will be opened. When, however, either the resistance $r$ or the resistance $r'$ is introduced into the field circuit by the operation of the switches 38 or 39, upon the lifting of the counter electromotive force relay, the relay 40 will drop and close the switch 41. The operation of this relay, however, during starting, does not affect the operative conditions in any way. When, however, the motor is brought to its full speed condition and the switch 41 closes, a new circuit is established for the winding 14 of the switch C which is independent of the switch B' and is dependent entirely upon the switch 41. This circuit is from the positive side of the line through the switch 41, wire 44, interlock 17, winding 14, interlock 18, wire 43, to the negative side of the line. The energization of the switch C after the motor comes up to full speed is therefore under the entire control of the switch of the field relay 40.

Assuming now that the motor is running at full speed in the forward direction with the resistance $r$ in series with the shunt field and the field relay 41 closed. When the bed of the planer reaches the limit of its travel, the switch B' will be moved to its opposite position so as to energize wires 12 and 13 and deënergize wires 10 and 11. The deënergization of the wire 10 has no effect on the switch C, but the deënergization of wire 11 causes the winding 36 to be deënergized, thereby allowing the switch 34 to open and switch 38 to close. This has the effect of connecting the resistance R into the motor armature circuit and short circuiting the resistance $r$ which was connected in the field circuit. The strengthening of the field due to the short circuiting of the resistance $r$ causes the motor to be automatically braked, since the inertia of the armature and of the bed of the planer will cause the motor to act as a generator and "pump back" into the line through the resistance R, assuming, of course, that the short circuiting of the resistance $r$ increases the field strength of the motor to such an extent that the counter or generated electromotive force is higher than the line or impressed electromotive force. The braking action takes place gradually due to the fact that it takes time for the field current to reach its maximum value because the field circuit is an inductive circuit. The current in the field circuit rises gradually when the resistance is cut out and the "pump back" current begins at zero and gradually increases, the rate of increase depending upon the coefficient of self-induction of the field circuit and the reduction in speed of the motor. The fact that the motor is operating as a generator tends to retard the speed of the armature and this in turn tends to decrease the generated electromotive force, consequently the braking current will reach the maximum value for this portion of the cycle when the rate of increase of the generated electromotive force due to the increased field current equals the rate of decrease due to reduction in speed. From this point on, the current will decrease. I therefore, so adjust the value of the resistance $r$ that the generated current will reach zero value just before the field has attained its full strength. At some point after the maximum value is reached and before the zero value is reached, the field will have attained such a strength as to prevent sparking at a relatively high armature current and at this point the relay coil 40 will be sufficiently energized to operate to open the switch 41. The opening of switch 41 causes the winding 14 of the switch C to be deënergized and this disconnects the motor from the line at the switches 22 and 23. The opening of the switch C causes the winding 26 of the brake contactor to be energized through the interlocks 17, 20 and 30 so that the switch 27 will now be closed to short circuit the motor armature upon itself through the resistance R and a second resistance R'. The value of the resistances R and R' is such as to permit the braking current to rise to the limit of commutation of the motor. The field now being strong, no sparking will occur even at this high value of the armature current and the torque on the armature tending to stop it will be heavy. The motor is thus brought to rest by a dynamic braking current which starts with a relatively low value and is increased to a maximum value as soon as the field has built up to its maximum value. The first cycle of the braking operation is performed by returning energy to the line, while the second cycle is performed by disconnecting the line and short circuiting the motor on itself. It is obvious, of course, that it is not essential to my invention that the first braking operation be performed in the manner described, but may be performed in any other well known manner, the essential feature of my invention being that the braking current is first relatively low and is then increased automatically when the field is strong enough to stand it.

The heavy dynamic braking current which flows when the armature is short circuited quickly stops the motor and when its speed has fallen to a predetermined value depending upon the adjustment of the counterelectromotive force relay 29 this relay will be deënergized, opening interlocks 30, 32 and 33 and closing interlock 31. As interlock 30 is opened winding 26 will be deënergized thus causing switch 27 to open the armature short circuit and switch 28 to close. As interlock 31 closes, winding 15 will be energized through a circuit from the positive main through switch B', wire 12, winding 15, interlock 18 on switch C, interlock 31 and thence to the negative side of the line. Switch D will therefore close connecting the armature circuit of the motor to the line so that current flows in the opposite direction and reverses the direction of rotation of the motor. The motor will be started and brought up to speed as before by the operation of the relay 29, the winding 37 this time being energized instead of 36. Resistance R will again be cut out of the armature circuit and the resistance $r'$ will be inserted in the field circuit. This resistance $r'$ is, as above stated, of higher value than the resistance $r$ so that the return movement will be at a greater speed than the forward movement. It is understood, of course, that these resistances $r$ and $r'$ may be adjusted as desired so as to give the speeds required. Ordinarily there will be very little occasion for varying the speed of the return stroke since the machine is doing no work. In some cases, however, this might be desirable and I have shown this resistance as being variable. This resistance $r$, however, should of necessity be variable, since the cutting speed will depend upon the nature of the material, depth of cut, etc. At the end of the return stroke the same sequence of operation occurs as has been described in connection with the forward stroke. The first effect is comparatively small dynamic braking current due to the "pump back" on the line and after the field builds up the braking current is automatically increased by the operation of the field relay which causes the disconnecting of the motor from the line and short circuiting the motor upon itself.

In Fig. 2 I have shown a modified form of my invention, the modification consisting broadly in substituting for the first dynamic braking step in which the braking effect is produced by returning energy to the line, means for short circuiting the armature through a resistance in the first step, as is done in the case of the second step but through a higher resistance. In other words, the first dynamic breaking step is accomplished by short circuiting the armature through a high resistance and, when the field builds up a section of the braking resistance is automatically cut out sufficiently to give the maximum braking current that the motor can handle. In this form of my invention it will be noted that I have provided an additional contactor F for short circuiting a resistance section R' which contactor is energized by the relay 47 which corresponds to the relay 40 in Fig. 1. In this case, however, the switch member 48 of the relay is normally open when the relay is deënergized instead of being normally closed, as in Fig. 1. It will be noted also that the switches C' and D' have one less interlock since it is now unnecessary that holding circuits be provided through the relay 47. The switches C' and D' will therefore be controlled entirely through the switch B'. Therefore, when the switch B' is thrown over, the contactors C', or D' whichever one happens to be up, will drop out and the brake contactor 27 will close. In this case I have also employed a series coil 50 on the brake contactor so as to hold the brake contactor closed until the motor has come substantially to rest.

The operation of this form of my device briefly described is as follows: When the switch B' is in the position shown in the drawing the line contactor C' will be energized through the wire 10, winding 14, interlock 21 on line switch D' and interlock 31 on the counterelectromotive force relay 29 to the opposite side of the line. This will start the motor through the resistance R, as in Fig. 1, by the closing of the contact arms 22 and 23. When the motor has reached a predetermined speed the contactor 36 will be closed to short circuit the resistance R from the armature circuit and insert the resistance $r$ in the field circuit. When the end of the stroke is reached in this direction of movement the switch B' will be thrown over so as to energize wires 12 and 13. This will deënergize line switch C' so as to disconnect the motor from the line. At the same time the brake contactor arm 27 will be closed by the energizing of the winding 26 through the interlocks 17 and 20. As in the case of the arrangement shown in Fig. 1 the contactor 36 will also drop out so as to insert the resistance R in the armature circuit and short circuit the resistance $r$ from the field circuit so that the field strength immediately begins to build up. The braking current, however, is relatively small at first, while the field is building up, since the two sections of resistance R and R' are in the braking circuit. When, however, the field builds up sufficiently the relay 47 will close to energize the contactor F through the switch 48. This will short circuit the resistance R' and increase the braking current to maximum value. It should be noted that the arm 27 of the brake contactor is held in by the series coil 50 in the braking circuit so that the brake contactor will not open until the motor has come substantially to rest. In the meantime the counterelectromotive force relay will drop so as to permit first the opening of the circuit of the winding 26, opening switch 27 and closing switch 28, and then when interlock 31 closes permitting the line contactor D' to close to operate the motor in the opposite direction of rotation. Upon reversal the same operation takes place. In fact the whole arrangement is practically the same as that disclosed in Fig. 1 with the differences noted, namely, that the first braking step is not accomplished by returning energy to the line but by cutting off the line and short circuiting the armature through a sufficiently high resistance.

It will thus be seen that I have provided an effective means for bringing the motor to rest with a braking effect which is much greater than would be feasible if the armature current had its maximum value when the braking circuit is first closed. This in addition to other features above described makes my arrangement extremely effective with reversing mechanism of the type referred to. While I have described my invention as being in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with an electric motor, reversing mechanism therefor, and means controlled by the current in the field of the motor for producing a graduated dynamic braking effect upon said motor when the reversing mechanism is operated.

2. The combination with an electric motor, reversing mechanism therefor, means for producing a dynamic braking effect upon said motor when the reversing mechanism is operated and means whereby the strength of said braking effect is caused to be dependent upon the field strength of the motor.

3. The combination with an electric motor, reversing mechanism therefor, means for producing a dynamic braking effect upon said motor when the reversing mechanism is operated, and means controlled by the current in the field of the motor for producing an increased braking effect upon said motor.

4. The combination with an electric motor having a shunt field winding and means for weakening said field during normal operation, of reversing mechanism therefor, means for strengthening the field when the reversing mechanism is operated, and means whereby the armature of said motor is brought substantially to rest by a dynamic braking current which is automatically increased as the shunt field strengthens.

5. The combination with an electric motor having a shunt field winding and means for weakening said field during normal operation, of reversing mechanism therefor, means for causing the field to strengthen when the reversing mechanism is operated so that the motor will act as a generator and generate a braking current which gradually increases as the field strength increases and means for automatically increasing the braking current when the strength of the field reaches a predetermined maximum.

6. The combination with an electric motor, of reversing mechanism therefor, means for causing said motor to act as a generator when the reversing mechanism is operated to generate a braking current which is relatively low when the field is weak, a relay having its energizing winding in the field circuit of the motor and means controlled thereby for automatically increasing the braking current when the motor field reaches a predetermined strength.

7. The combination with an electric motor, of reversing mechanism therefor, means for producing a dynamic braking torque on the motor when the reversing mechanism is operated, an electromagnetic switch having its energizing winding in the field circuit of the motor, and means controlled by said switch for increasing the dynamic braking torque on the motor.

8. The combination with an electric motor, of reversing mechanism therefor, means for dynamically braking the motor when the reversing mechanism is operated by causing the motor to act as a generator and return current to the line, and means controlled by the strength of the field for disconnecting the line and short circuiting the motor on itself.

9. The combination with an electric motor having a shunt field, means for weakening said field during normal operation, a reversing mechanism therefor, means for dynamically braking the motor when the reversing switch is operated by strengthening the field and causing the motor to act as a generator and return current to the line, and means controlled by the current in the motor field for increasing the dynamic braking torque after the field of the motor has built up.

10. The combination with an electric motor, a reversing switch therefor, means for producing a dynamic braking effect upon said motor when the reversing mechanism is operated, means controlled by the current in the field of the motor for producing an increased braking effect, and means for preventing the reversing connections from becoming operative until the speed of the motor armature is reduced to a predetermined value.

11. The combination with an electric motor having a shunt field and means for weakening said field during normal operation, a reversing mechanism therefor, means for strengthening the field when the reversing mechanism is operated, means whereby the armature of said motor is brought substantially to rest by a dynamic braking current which is automatically increased as the shunt field strengthens, and means for preventing the reversing mechanism from becoming operative to reverse the motor until the speed of the motor armature is reduced to a predetermined value.

12. The combination with an electric motor, an electromagnetic reversing mechanism therefor, a master switch for controlling said reversing mechanism, means for producing a dynamic braking effect on said motor when the master switch is operated, means dependent upon the field strength of the motor for increasing the dynamic braking effect and means whereby the reversing mechanism does not respond to the movement of the master switch until the motor is brought substantially to rest by said dynamic braking.

13. The combination with an electric motor having a shunt field winding and means for weakening said field during normal operation, an electromagnetic reversing mechanism therefor, a master switch for controlling said mechanism, means whereby the shunt field of the motor is strengthened when the master switch is operated so as to cause the motor to act as a generator and return current to the line thereby dynamically braking the motor, connections whereby the reversing mechanism is opened and the motor armature short circuited on itself when the shunt field builds up, and connections whereby the reversing mechanism does not close to reverse the motor in response to the movement of the master switch until the motor is brought substantially to rest by said dynamic braking.

14. The combination with an electric motor, of a circuit controlling switch therefor, and means controlled by the current in the field of the motor for producing a graduated dynamic braking effect upon said motor when the switch is operated.

15. The combination with an electric motor, of a circuit controlling switch therefor, means for producing a dynamic braking effect upon said motor when the switch is operated, and means controlled by the current in the field of the motor for producing a graduated braking effect upon said motor.

16. The combination with an electric motor, of a circuit controlling switch therefor, means for producing a dynamic braking effect upon the motor when the switch is operated, an electromagnetic switch having its energizing winding in the field circuit of the motor, and means controlled by said electromagnetic switch for increasing the braking torque on the motor.

17. The combination with an electric motor having a shunt field winding and means for weakening said field during normal operation, of controlling mechanism therefor, means for strengthening the field when the controlling mechanism is operated, and means whereby the armature of said motor is brought substantially to rest by a dynamic braking current which is automatically increased as the shunt field strengthens.

In witness whereof I have hereunto set my hand this 22nd day of April 1912.

JOHN E. BROBST.

Witnesses:
 HELEN ORFORD,
 BENJAMIN B. HULL.

Copies of this patent may be obtained for five cents each, by addressing the "Commissioner of Patents, Washington, D. C."